United States Patent [19]
Bach et al.

[11] Patent Number: 6,084,595
[45] Date of Patent: Jul. 4, 2000

[54] INDEXING METHOD FOR IMAGE SEARCH ENGINE

[75] Inventors: Jeffrey R Bach; Bradley Horowitz, both of San Mateo, Calif.

[73] Assignee: Virage, Inc., San Mateo, Calif.

[21] Appl. No.: 09/028,279

[22] Filed: Feb. 24, 1998

Related U.S. Application Data
[60] Provisional application No. 60/036,011, Feb. 24, 1997.

[51] Int. Cl.⁷ .................................................. G06T 17/00
[52] U.S. Cl. ............................................................. 345/431
[58] Field of Search .................................. 345/418, 430, 345/431, 429, 432

[56] References Cited

U.S. PATENT DOCUMENTS

| | | | |
|---|---|---|---|
| 5,647,058 | 7/1997 | Agrawal et al. | 395/601 |
| 5,892,516 | 4/1999 | Alexander | 345/431 |
| 5,896,121 | 4/1999 | Kafer | 345/431 |
| 5,940,067 | 8/1999 | Greene | 345/431 |
| 5,949,409 | 9/1999 | Tanaka et al. | 345/431 |
| 5,949,427 | 9/1999 | Nishikawa et al. | 345/431 |
| 5,949,967 | 9/1999 | Spaulding et al. | 345/431 |

OTHER PUBLICATIONS

Beckmann, Norbert, Hans–Peter Kriegel, Ralf Schneider and Bernhard Seeger, SIGMOD Conference, pp. 322–331, 1990, "The R*–tree: An Efficient and Robust Access Method for Points and Rectangles".

Berchtold, Stefan, Daniel A. Keim, and Hans–Peter Kriegel, Proceedings of the 22$^{nd}$ VLDB Conference, Mubai (Bombay), India, pp. 28–39, 1996, "The X–tree: An Index Structure for High–Dimensional Data".

Bozkaya, Tolga and Meral Ozsoyoglu, Proceedings, ACM SIGMOD Conference, pp. 357–368, 1997, "Distance–Based Indexing for High–Dimensional Metric Spaces".

Faloutsos, Christos and Ibrahim Kamel, Data Engineering Bulletin, 16(3):28–33, 1993, "High Performance R–trees".

Kamel, Ibrahim and Christos Faloutsos, Proceedings of the 20$^{th}$ VLDB Conference, Santiago, Chile, pp. 500–509, 1994, "Hilbert R–tree: An Improved R–tree Using Fractals". .

Lin, King–Ip, H.V. Jagadish, and Christos Faloutsos, VLDB Journal, 3(4):517–542, 1994, "The TV–Tree: An Index Structure for High–Dimensional Data".

Mark, David M. and Michael F. Goodchild, Spatial Data Processing Using Tesseral Methods, Diaz, B. and S. Bell, eds., National Environment Research Council, pp. 179–192, 1986, "On the Ordering of Two–Dimensional Space: Introduction and Relation to Tesseral Principles".

Roussopoulos, Nick, Stephen Kelley, and Frederic Vincent, SIGMOD Conference, pp. 71–79, 1995, "Nearest Neighbor Queries".

Seidl, Thomas and Hans–Peter Kriegel, Proceedings of the 23$^{rd}$ VLDB Conference, Athens, Greece, pp. 506–515, 1997, "Efficient User–Adaptable Similarity Search in Large Multimedia Databases".

Theodoridis, Yannis and Timos Sellis, IGIS, pp. 270–273, 1994, "Optimization Issues in R–tree Construction (extended abstract)".

*Primary Examiner*—Phu K. Nguyen
*Assistant Examiner*—Cliff N. Vo
*Attorney, Agent, or Firm*—Knobbe, Martens, Olson & Bear, LLP

[57] ABSTRACT

One aspect of the invention is directed to a search engine having indexed retrieval to improve computational efficiency of searching large databases of rich objects such as images. Feature vectors are extracted from images and stored in a feature vector database. When a query is submitted to the engine, a query feature vector Q will be specified, as well as a distance threshold T, indicating the maximum distance that is of interest for this query. All images within a distance of T will be identified by the query. Range constraints are defined such that all feature vectors within a distance of T of the query feature vector, satisfy all of the range constraints. The constraint is dependent on the specific primitive being indexed. The constraint is also defined such that any feature vector which is within a distance of T of the query feature vector also satisfies a functional constraint. By reducing the number of feature vectors retrieved from the database and the number of feature vector comparisons, the query process becomes much more efficient.

21 Claims, 5 Drawing Sheets

INDEXING ENGINE

FIG. 4  INDEX GENERATION

CONSTRAINT GENERATION

INDEXING METHOD FOR IMAGE SEARCH ENGINE

This application claims the benefit of U.S. Provisional No. 60/036,011 filed Feb. 24, 1997.

BACKGROUND OF THE INVENTION

1. Field of the Invention

The present invention generally relates to database technology, and more specifically, to a way of accelerating content-based retrieval of visual objects by use of indexing techniques.

2. Description of the Related Technology

Recently, a need has developed to search very large databases of visual objects, such as images, which may contain upwards of one million or more images. Since content-based retrieval allows for the defining of more than one primitive (each primitive being associated with a visual characteristic such as color, texture, shape, and so forth) per image and each primitive requires significant computation, comparisons in a large search space become computationally intensive. Thus, the technical challenge of scalability in content-based retrieval is addressed by the present invention.

Collections of electronic images can effectively be searched using a content-based retrieval search engine. For instance, an image search engine can be licensed from Virage, Inc. of San Mateo, Calif. The Virage search engine is described in U.S. patent application Ser. No. 08/829,791, filed Mar. 28, 1997.

A search engine typically comprises two phases: analysis and comparison. The analysis phase characterizes images stored in the system or referenced by the system by pre-defined or user defined primitives. Each primitive extracts visual feature data which is combined into a feature vector. In the comparison phase, a target or query feature vector is compared to the feature vectors which have previously been computed. These feature vectors are typically stored in a database. The target feature vector represents, for example, an image for which the user desires to find similar images.

Referring to FIG. 1, an image(i) 102, i.e., the i-th image stored in the database, is fed into an analysis phase module 104 of a visual information retrieval (VIR) engine 100 for analysis. In the analysis phase 104, a feature vector (i) 106 for the image is extracted and stored into a database 108. This process is repeated until all stored images have been analyzed and had associated feature vectors created and stored. In a comparison phase, a feature vector (target) 110 is fed into a comparison phase module 112 VIR engine and the VIR engine sequentially computes distances between the target feature vector 110 and each feature vector(i) 106 stored in the database 108. The comparison is made between individual feature vectors using a distance metric associated with a primitive. The distance is then selectively weighted using user-defined weights 114 and weighted distances are combined to provide an output score 116 for each comparison. The output score 116 is a scalar which can be used to select the best result or rank order the results for further searching. For instance, in a stock photography scenario, a publisher may desire to see photographs of sunsets which satisfy a certain criteria established by selecting weights 114. A set of thumbnail sketches may be presented on a visual display showing the results to the publisher and allowing for refinement by repetitive searching.

Typically this process must compute a distance between the feature vector 110 of the target image and every other feature vector 106 referenced by the system. This may require an enormous amount of time and computing resources, but will guarantee that the most similar images are identified. The amount of time required for this approach includes the time required to compute the visual distance, as well as the time required to retrieve every feature vector 106 into memory. If the feature vectors 106 are stored in a commercial database system, this retrieval time will be considerable.

SUMMARY OF THE INVENTION

One embodiment of the present scalable searching for images invention is a modification of the VIR search engine. The present invention reduces the amount of resources required to identify the most similar images. This approach will still guarantee that the images most similar to the query image are identified. This invention utilizes additional information computed from the feature vector, which can then be used as an index. An index is a common concept in database technology. An index is used to retrieve the desired information from a database, without having to visit every record in the database. Typically, indexes are implemented using data structures such as B trees, B+ trees, R trees, Kd trees, inverted index structures, and so forth. Descriptions of these and other common approaches can be found in most database books such as "File Structures," (B. Salzberg, Prentice Hall, 1988) and "The Design and Analysis of Spatial Data Structures," (H. Samet, Addison-Wesley, 1989). Most commercial database systems, such as Oracle and Informix, take advantage of such indexing techniques to provide very efficient retrieval of information from the database. This invention provides the capability of using such systems for very efficient content-based retrieval of visual objects such as images stored in such a system.

In the context of content-based retrieval, an image may be distilled according to one or more primitives. A primitive is a semantically meaningful feature of an image. Thus, color, texture, and shape are all general image primitives. However, domain specific primitives may be defined in the extensible similarity engine as discussed in U.S. patent application Ser. No. 08/829,791, filed Mar. 28, 1997, which is hereby incorporated by reference. By definition, a primitive must include a data representation and a distance measure which ultimately provides the basis for a similarity measurement between two different images.

In the present invention, the notion of a primitive is now expanded to include functionality to generate index values which are stored in the index structure, and functionality to determine the constraints on the index values. These constraints are used to indicate which of the feature vectors may actually satisfy the query. Only this subset of feature vectors must then be retrieved for the complete feature vector comparison. The particular index values, and the corresponding constraints can take any form.

In one embodiment of the present invention there is a method of feature vector indexing, comprising the steps of providing a plurality of feature vectors, each feature vector indicative of one of a plurality of objects, wherein each feature vector comprises at least one primitive, each primitive being associated with an attribute of the object and identifying a plurality of features, each feature having an associated feature coefficient; using a distance metric to select index values which are indicative of features of the feature vector; providing a target feature vector and a plurality of user weights; generating a constraint based on the target feature vector and the plurality of user weights;

and applying the constraint to the index values so as to select a subset of the feature vectors.

In another embodiment of the present invention there is a method of feature vector indexing, comprising the steps of providing a plurality of feature vectors, each feature vector indicative of one of a plurality of objects, wherein each feature vector comprises at least one primitive, each primitive being associated with an attribute of the object and identifying a plurality of features; using a distance metric to select a plurality of index values which are indicative of features of the feature vector; and generating an index structure corresponding to the feature vectors and accessed by the selected index values.

In yet another embodiment of the present invention there is a method of feature vector indexing, comprising the steps of providing a plurality of feature vectors, each feature vector indicative of one of a plurality of objects; providing an index structure corresponding to the feature vectors, wherein the index values of the index structure are indicative of features of the feature vectors; providing a target feature vector and a plurality of user weights; generating a constraint based on the target feature vector and the plurality of user weights; and applying the constraint to the index structure so as to select a subset of the feature vectors.

DETAILED DESCRIPTION OF THE PREFERRED EMBODIMENTS

Figure 1:
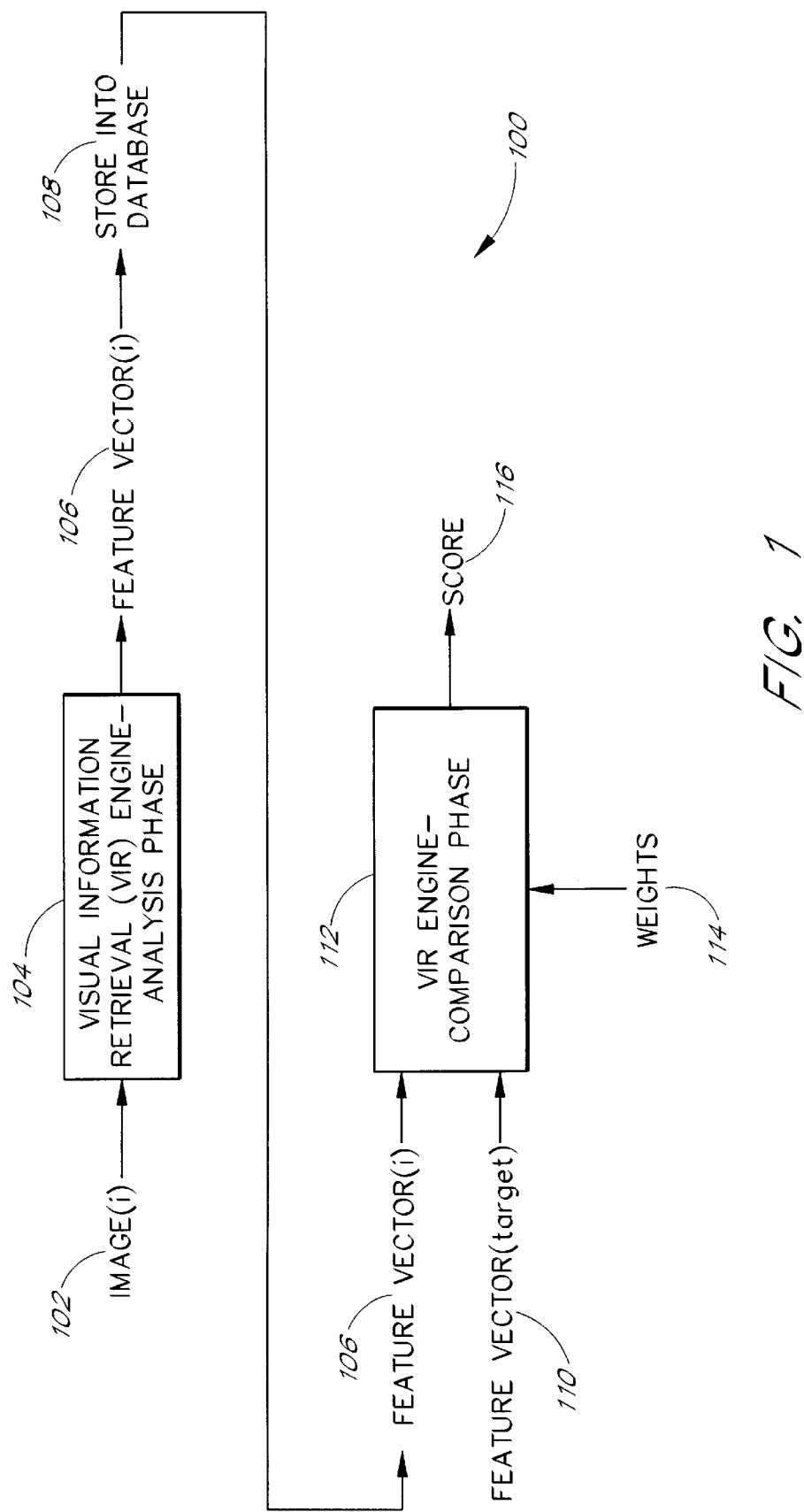
FIG. 1 is a block diagram of a standard visual object retrieval system.

The following detailed description of the preferred embodiments presents a description of certain specific embodiments to assist in understanding the claims. However, the present invention can be embodied in a multitude of different ways as defined and covered by the claims. Reference is now made to the drawings wherein like numerals refer to like parts throughout.

Overview

The following example illustrates the benefit of using index values in an application for content-based retrieval of visual objects such as images. Consider an image management system which is used to store one million images. For each of these images, a feature vector is computed and stored in a commercial database, such as that provided by Oracle or Informix. For this example, each feature vector includes a single primitive. Although, primitives may use any number of methods to determine similarity, in one embodiment, weighted Euclidean distance is used as the distance metric for this primitive. This is a very common distance metric, and is used in a similar scenario such as Eigenfaces. Use of Euclidean distance is also described in "The TV-Tree: An Index Structure for High-Dimensional Data," King-Ip Lin, H. V. Jagadish, Christos Faloutsos, VLDB Journal 3(4): 517–542, 1994, and in "Distance-Based Indexing for High-Dimensional Metric Spaces," Tolga Bozkaya, Z. Meral Özoyoglu, Proceedings, ACM SIGMOD Conference, 1997, pp. 357–368.

In one example, representation required for calculating a weighted Euclidean distance, a primitive is represented by one hundred floating point values or features, $V_1, V_2, \ldots, V_{100}$. The distance, D, between a query feature vector Q and a candidate feature vector C is computed as follows:

$$D = \sqrt{\begin{array}{c}(W_1(Q_1 - C_1)^2 + W_2(Q_2 - C_2)^2 + \\ W_3(Q_3 - C_3)^2 + \ldots + W_{100}(Q_{100} - C_{100})^2\end{array}}$$

Some subset of these values may represent the index for each of the feature vectors. Assume ten such values are chosen. In one embodiment, the ten values that are used must be the same values for each image, although this may not be required in other embodiments. For this example, the ten values corresponding to the ten highest values of feature coefficients $w_i$ are used, assuming that they will have more influence on the overall distance. For purposes of this discussion, an assumption is made that these ten values are the first ten values of the feature vector, i. e., values $V_1$ through $V_{10}$.

When a query is submitted to the VIR engine, a query feature vector Q will be specified, as well as a distance threshold T, indicating the maximum distance that is of interest for this query. All images within a distance of T, will be identified by the query. The threshold T can be specified in several different ways depending on the application. For example, the threshold can be set by a user, hard-coded by a programmer, or determined by a set of rules. The rules may consider items such as the size of the database, the type of query, and other factors. The index values are used to reduce the number of feature vectors that are retrieved from the database to complete the query. In one embodiment, the set of index values is used in two ways by the indexing process. A first phase specifies simple ranges for each index value, such that a feature vector only needs to be considered if all of its index values satisfy their corresponding ranges. Simple ranges are used because they can be processed very efficiently by commercial database systems. This allows the current invention to efficiently utilize commercial database products for storing the index values. The range constraints are defined such that all feature vectors within a distance of T of the query feature vector also satisfy all of the range constraints. For the given example, the required range for each index is computed as:

$$C_i : [Q_i - (T/\sqrt{W_i}), Q_i + (T/\sqrt{W_i})]$$

A second phase is more selective but the types of functionality may not be processed as effectively by many existing database systems. This constraint is dependent on the specific primitive being indexed. The constraint is also defined such that any feature vector which is within a distance of T of the query feature vector also satisfies this functional constraint. For this example, the functional constraint is defined as:

$$\sqrt{\begin{array}{c}W_1(Q_1 - C_1)^2 + W_2(Q_2 - C_2)^2 + \\ W_3(Q_3 - C_3)^2 + \ldots + W_{10}(Q_{10} - C_{10})^2\end{array}} \Leftarrow T$$

A feature vector which does not satisfy the requirements of both of these phases does not need to be considered any further for this query. It is not possible for this feature vector to be within a distance T of the query feature vector. By reducing the number of feature vectors retrieved from the database and the number of feature vector comparisons, the query process becomes much more efficient.

Figure 2:
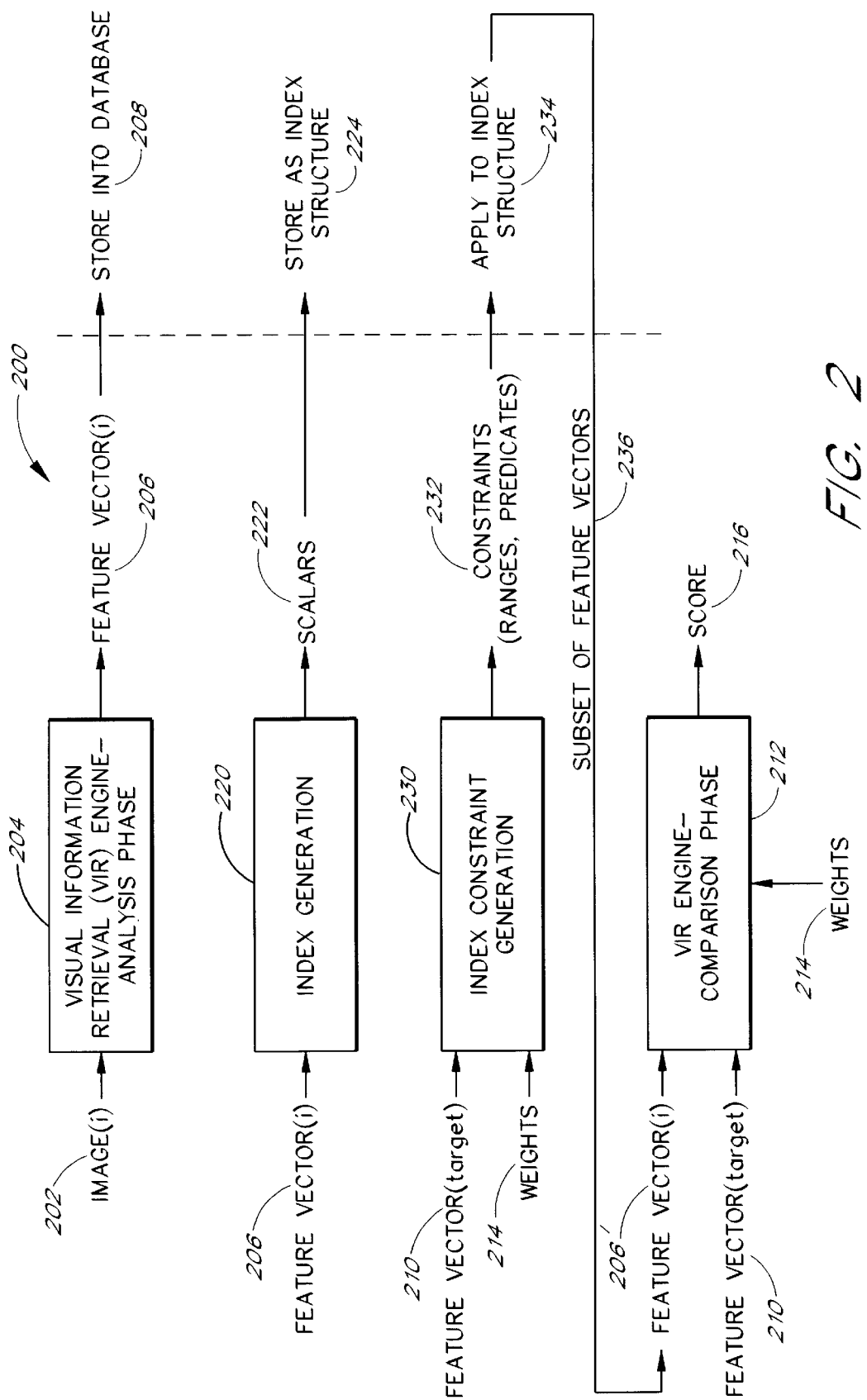
FIG. 2 is a block diagram of an indexed visual object retrieval system of the present invention.

Referring to FIG. 2, an indexed visual object retrieval system 200 will be described. The system is based on the VIR engine components, analysis phase module 204 and comparison phase module 212, described in conjunction with FIG. 1. Two new functions are added to each primitive utilized: index generation 220 and index constraint generation 230. For an indexed color primitive, for example, an index generation function is added to the primitive. The index generation function 220 may extract the dominant hue value from the image as an index, for instance. This index, perhaps along with other indexes associated with other primitives, provides the basis for storing a set of index values or scalars 222 in an index structure 224. The image target or query as defined by its feature vector 210 along with user-defined weights 214 are provided to an index constraint generation function 230 associated with the primitive. For instance, given a target image having a dominant hue of a number, say X, and a certain weight selected during the comparison phase 212, a constraint 232 may be X±Y, where Y is a tolerance value, which is then applied 234 to the index structure. The index structure 224 is searched using well-known algorithms resulting in a subset 236 of the entire universe of stored feature vectors being used in comparison computations with the target feature vector 210.

This indexing process is shown in a block diagram format in FIG. 2. Note that each primitive may provide one or two scalars 222 as a result of index generation 220 and, as an example, there may be on the order of ten scalars 222 generated per image 202. This makes for a much smaller search space and therefore a more efficient search of the large space. The comparison phase 212 operates the same as in the standard VIR engine 100, shown schematically in FIG. 1, except that instead of a sequential search over all feature vectors 206, only a subset 236 of relevant feature vectors is compared to provide scores 216 for ranking the similarity of images.

Indexing Engine

Figure 3:
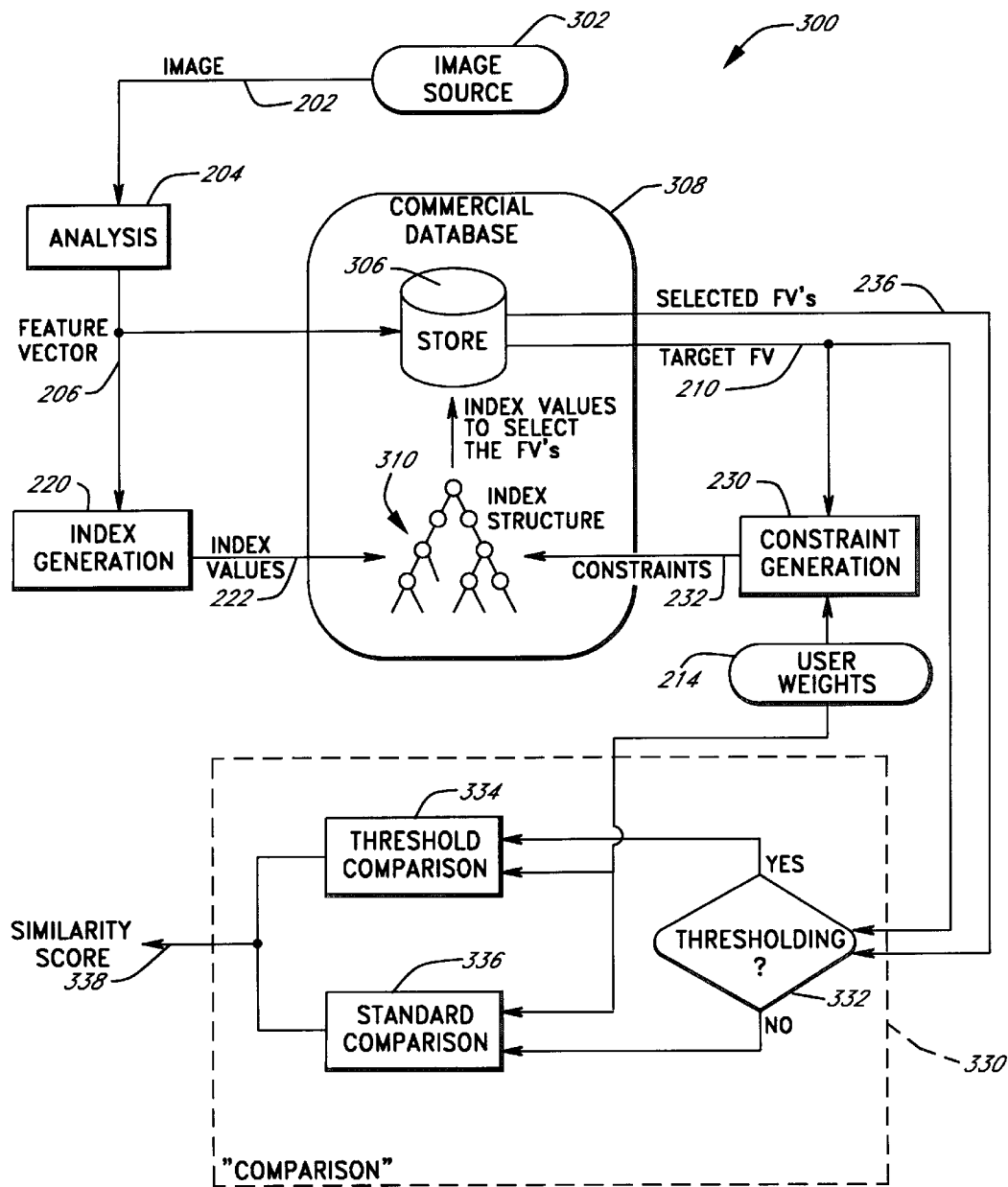
FIG. 3 is a diagram of a process performed by one embodiment of the indexed visual object retrieval system shown in FIG. 2.

Referring to FIG. 3, one embodiment 300 of the VIR engine with indexing capability will be described. An image source 302, such as a database, provides visual objects, such as images 202, to the analysis phase module 204, previously described. The analysis module 204 generates a feature vector 206 for each visual object 202 that it receives from the image source 302. The feature vector 206 is sent to be stored in a commercial relational database 308, such as available from, for example, Informix or from Oracle Corporation. The database 308 includes a data store 306, which stores the feature vectors 206, and an index structure 310, which is further described hereinbelow. Each feature vector 206 is also sent to the index generation function 220. The index generation module 220 generates index values that are stored in the index structure 310.

A target object or image is sent to the analysis module 204 to generate a target feature vector 210 that is also stored in the data store 306. The target image and feature vector is further explained in U.S. patent application Ser. No. 08/829,791, filed Mar. 28, 1997. The target feature vector 210, and a set of user-defined weights 214 if multiple primitives are used for indexing, are inputs to the constraint generation function 230. The set of constraints 232 at the output of the constraint generation function 230 are then applied to the index structure 310 so as to identify index values used to select from among the universe of feature vectors stored in the data store 306. The selected feature vectors 236 and the target feature vector 210 are then fed to a comparison module 330 which generates a similarity score 338 for each one of the selected feature vectors 236 as compared to the target feature vector 210.

In one embodiment, a decision is made at state 332 to determine if a thresholding comparison is to be done. If so, a threshold comparison process 334 is performed using the selected feature vectors 236, the target feature vector 210, the user-defined weights 214, and a comparison threshold (not shown) to generate the similarity score 338. Else if the thresholding comparison is not to be done, as determined at state 332, a standard comparison process 336 is performed using the selected feature vectors 236, the target feature vector 210 and the user-defined weights 214 to generate the similarity score 338. The threshold comparison process 334, the standard comparison process 336, and the hardware components used for execution of the analysis module 204 and the comparison module 330 are described in U.S. patent application Ser. No. 08/829,791, filed Mar. 28, 1997. The index generation function 220 and the constraint generation function 230 are also performed using the same hardware components.

Index Structure

Several possible data structures 310 to store the index values 222 can be utilized. The choice of the index structure depends on the software architecture in which the invention is situated. There are three possible architectural scenarios, each resulting in a different choice of the index structure.

(A) In the first scenario, the index-enhanced engine 300 makes use of a commercial database 308. In this case, the index values 222 corresponding to a particular primitive are stored in the commercial database 308 as "index-only" columns. These values are indexed by the internal index structure of the database. Thus, the type of the index structure 310 is predefined by the commercial database.

(B) In the second scenario, the engine 300 runs on a storage server, which provides a limited set of well-known indexed structures like B-trees, as described in textbooks such as "File Structures," (B. Salzberg, Prentice Hall, 1988). In this case, the index structure can be implemented by a data structure that is known to have the lowest expected search time for range-queries on multiple attributes. In case such a multidimensional data structure is not offered, the index values are "linearized" using a space-filling curve such as the Hilbert curve, using techniques such as described in "Hilbert R-tree: An Improved R-tree using Fractals," (I. Kamel and C. Faloutsos, Intl. Conf. on VLDB, 1994, pp. 500–509) or in "On the Ordering of Two-dimensional Space: Introduction and Relation to Tesseral Principles", (Proceedings of the Workshop on Spatial Data Processing Using Tesseral Methods, Mark, David M. and Michael F. Goodchild, 1986, Swindon, UK: Natural Environment Research Council). The linear curve is stored in a system-provided data structure. This scenario may be used if the number of index attributes does not exceed three. In case this is not feasible, scenario (C) may be used.

(C) A third scenario occurs when the proposed index-enhanced engine 300 is implemented by making use of a file system. In such a case, an R-tree variant, as described in works by N. Beckman, et al., C. Faloutsos and I. Kamel, and Y. Theodoridis and T. K. Sellis ("The R*-Tree: An Efficient and Robust Access Method for Points and Rectangles", SIGMOD Conference 1990, pp. 322–331; "High Performance R-trees", Data Engineering Bulletin 16(3): 28–33, 1993; and "Optimization Issues in R-tree Construction", IGIS 1994: 270–273, respectively) would be used. Alternatively, an X-tree structure could be used as described in "The X-tree: An Index Structure for High-Dimensional Data", International Conference on VLDB 1996: 28–39, by S. Berchtold, D. A. Keim, and H-P. Kriegel.

Constraint Application on Index Structure

The following discussion describes how the constraint expressions are applied to the index structure 310 (FIG. 3) so as to identify the selected set of feature vectors 236. The usage of the constraint function 230 in each of the three scenarios mentioned above will be described. In each case, the constraint function is exemplified by a weighted Euclidean distance, although another constraint function may be used. For this example, the query is to find all k-dimensional index vectors $v_i$ such that the weighted Euclidean distance between it and the query vector $v_q$ is less than or equal to D. Thus, $$\sqrt{\begin{array}{c}W_1*(v_i[1]-v_q[1])^2+W_2*(v_i[2]-v_q[2])^2+\ldots+\\ W_k*(v_i[k]-v_q[k])^2\end{array}} \Leftarrow D \quad \text{Equation 1:}$$

(A) In the first scenario, the constraints are enforced in two steps:

First, a range query is issued to the database to find all vectors vi such that:

$v_i[1]$ lies between $v_q[1]-D/\sqrt{W_1}$ and $v_q[1]+D/\sqrt{W_1}$ and $v_i[2]$ lies between $v_q[2]-D/\sqrt{W_2}$ and $v_q[2]+D/\sqrt{W_2}$ and ...

$\vdots$ $v_i[k]$ lies between $v_q[k]-D/\sqrt{W_k}$ and $v_q[k]+D/\sqrt{W_k}$.

Let the results returned by the commercial database system be collected in memory in the vector set P.

In the second step, all the vectors V from P that satisfy the constraint specified by Equation 1 will be evaluated. The vector set V represents the final set of feature vectors, which are used in actual comparison by the comparison module 330.

(B) In the second scenario, a single dimensional structure is used to store values representing multiple dimensions. In this case, the values can be linearized into a one-dimensional key which can be effectively indexed by the one-dimensional index structure. This is commonly done using a space-filling curve such as a Hilbert curve. In this scenario, the range constraints for each index value are identical to those computed in the first scenario (A) above. However, in order to use the one-dimensional index structure, the one-dimensional key must be computed for each combination of valid values for the set of dimensions which satisfy the original constraint given in Equation 1. This set of one-dimensional keys can then be sorted such that consecutive values can be specified as a valid range for the index.

It is common to use a coarse representation for the original data when linearizing values with a high cardinality, such as floating point numbers. This coarse representation maps a range of values into a new value along a given dimension. For example, to compute a one-dimensional key for a particular set of index values, one of the values may map the original index values [0, 10] to the value 1, [10, 20] to the value 2, and so on. These new values are actually used to compute the one dimensional index key. In this scenario, ranges on the one-dimensional key must represent all possible values for the key which represent all combinations of the original index values which satisfy the overall constraint given by Equation 1 above.

(C) In the third scenario, there are two possibilities:

If an R-tree variant is used, the following steps are used to find the proper vectors.

(a) set i=1;

(b) use the algorithm of N. Roussopoulos, S. Kelley, F. Vincent, from "Nearest Neighbor Queries" SIGMOD Conference 1995, 71–79, to find the i*B nearest neighbors of $v_q$ from the k-dimensional index;

(c) For each vector v(i,j) retrieved, calculate d(j)=dist(vq, v(i,j)), where dist is the weighted Euclidean distance in the example;

(d) compute the dmax=max(d(1), d(2), d(3) . . . d(i*B));

(e) if dmax>D go to step (f), else go to step (i);

(f) truncate the array d(j) at d(M) such that d(M)<=D and d(M+1)>D;

(g) the vectors corresponding to d(1), d(2) . . . d(M) are the indexed set;

(h) end.

(i) set I=I+1;

(j) go to step (b);

If the index structure is represented by an X-tree, the constraints are enforced in two steps:

First, an elliptical range search is performed by using the algorithm in "Efficient User-Adaptable Similarity Search in Large Multimedia Databases," (T. Seidl, H-P. Kriegel, International Conference on VLDB 1997: 506–515) to find all vectors vi such that:

$v_i[1]$ is limited by $v_q[1]-D/\sqrt{W_1}$ and $v_q[1]+D/\sqrt{W_1}$ and $v_i[2]$ is limited by $v_q[2]-D/\sqrt{W_2}$ and $v_q[2]+D/\sqrt{W_2}$ and ...

$\vdots$ $v_i[k]$ is limited by $v_q[k]-D/\sqrt{W_k}$ and $v_q[k]+D/\sqrt{W_k}$.

Let the search results be collected in memory in the vector set P.

In the second step, all the vectors V from P that satisfy the constraint specified by Equation 1 are evaluated. The vector set V represents the final set of feature vectors, which are used in actual comparison by the comparison module 330.

Multiple Primitives

A description of operation of the system 300 using multiple primitives and their individual associated user-weights follows. For each query, a maximum threshold, T, is provided to indicate the maximum distance that an image should be considered a valid result. This allows a user to control the quality of results that are retrieved, and indirectly, the number of results that are retrieved. Only those results which are within a distance of T from the query image are retrieved.

In one embodiment, a maximum threshold, $T_i$, is computed for each individual primitive distance computation. The value $T_i$ is passed to the index constraint function for each primitive i. It is this value that is used to compute the constraints as discussed hereinbelow.

When multiple primitives are used in a query, a user-defined weight value is assigned to each primitive to indicate its relative importance with respect to the other primitives. This is described in U.S. patent application Ser. No. 08/829,791, filed Mar. 28, 1997. The user-defined weights are important for generating the most efficient constraints on the indexing values.

If a single primitive is being used in the query, then the threshold value $T_0$ for that primitive will be the same as the overall threshold T. The threshold T is passed in as part of the query as described in the Overview section above. In general, the individual primitive distances must be combined to compute the overall distance between the feature vector and the query feature vector. The comparison function 330 uses the individual primitive distances and the user-defined weights, $W_i$, associated with each primitive.

Many known methods can be used to combine the primitive distances based on their corresponding weights. One method of combining the primitive distances is to compute the weighted sum of the individual primitive distances, based on their corresponding weights:

$$D = \sum_i (W_i * d_i) \bigg/ \sum_i W_i \text{ where } i \text{ is 0 to } n-1, n \text{ is the number}$$

of primitives and $\sum_i W_i$ is the sum of all weights $W_i$.

In this case, the threshold values, Ti, for each primitive are computed as follows:

$$T_i = T \sum (W_i)/W_i$$

If $W_i = 0, T_i = 0$.

This computes an upper limit for the distance of each primitive. If any primitive distance exceeds its corresponding threshold, the overall distance for that feature vector will be within the required threshold for the query. This enforces the concept that any feature vector which is within a distance of T from the query feature vector 210 will not be eliminated from consideration by the indexing process. This is true regardless of the dissimilarity of any particular primitive.

In another embodiment, if a different method is used for combining the primitives, the same approach can be used to compute the distance tolerances. $T_0$ guarantee that the overall threshold, T, is honored, the threshold for each primitive, $T_i$, is computed as though all other primitives have a distance of 0 ($d_j=0$, where $j \neq i$) from the query feature vector 210.

For example, consider a function F which computes the overall distance D from the individual primitive distances, di, and the corresponding weights, wi:

$$D = F(d_0, W_0, d_1, W_1, \ldots, d_{(n-1)}, w_{(n-1)}).$$

Given a threshold T for a given query, the threshold values, $T_i$, for each primitive can be computed as follows:

$$T_i = \max (d_i) \text{ such that } F(\ ) <= T, \text{ where } d_j=0, j \neq i.$$

Index Generation

Figure 4:
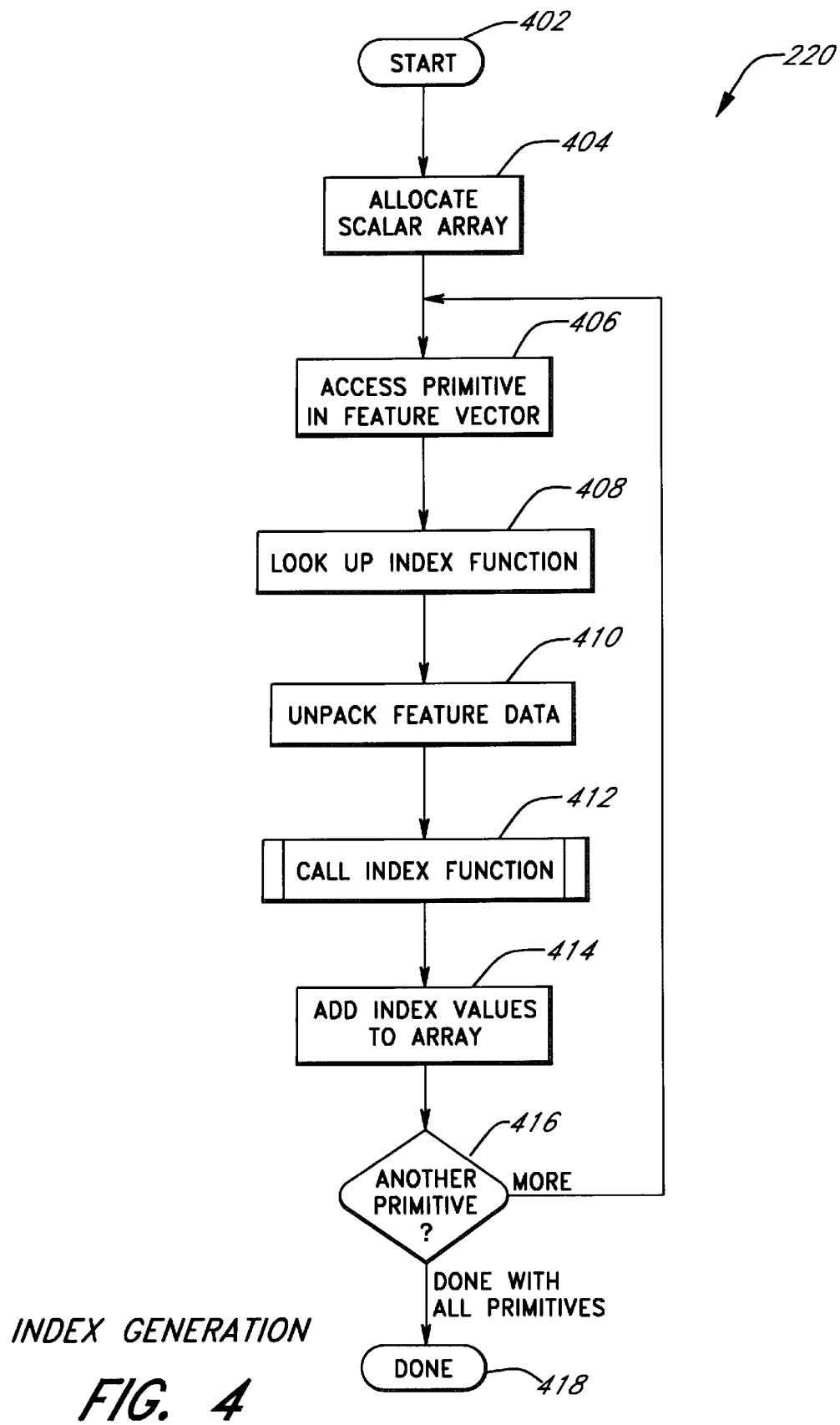
FIG. 4 is a flowchart of the index generation process shown in FIG. 3.

Referring now to FIG. 4, the index generation function 220 used to generate or compute indexes will be described. Function 220 generates a scalar array having a set of index values. Beginning at a start state 402, function 220 moves to a state 404 wherein an empty scalar array is allocated. Proceeding to state 406, function 220 accesses one of the primitives in the feature vector for the image 202 (FIG. 3). Continuing at state 408, the function 220 looks up the index function for the primitive accessed in state 406. Moving to state 410, the function 220 unpacks the feature data for the accessed primitive and, at state 412, calls the index function identified in state 408. The index function will be described hereinbelow. Proceeding to state 414, the index values selected by the index function are added to the scalar array allocated in state 404. Advancing to a decision state 416, the function 220 determines if there are additional primitives in the feature vector to be processed. If so, function 220 moves back to state 406 to access the next primitive. Otherwise, if all primitives have been processed, as determined at decision state 416, function 220 completes at state 418.

Generation of index values from a feature vector can be accomplished in several different ways. The actual method is dependent on the nature of the feature vector. Three alternate embodiments for the index generation function 220 are described below.

In one embodiment, consider that a N-valued feature vector F has the internal form $((v(1),w(1)), (v(2),w(2)), \ldots (v(N),w(N)))$ where the i-th entry represents v(i), the value of the i-th element of the feature vector, and w(i), the weight of the feature vector element within the vector. The weights here are part of the primitive itself, and has been determined by the designer of the primitive. In this context, the index generation function can be the following:

(a) choose the dimensionality of the index. Let it be k;
(b) create a k-valued array I;
(c) sort the elements of the feature vector F in descending order of weight w(i) and let G be the sorted feature vector;
(d) construct index vector I with I(1)=G(1), I(2)=G(2) . . . I(k)=G(k).

As another embodiment of the index function consider that there exists a population of M example visual assets. Also consider that for the i-th visual asset, the N-valued feature vector F(i) is represented by values (v(i,1), v(i,2), . . . v(i,N)). Thus there are a total of M feature vectors. In this case, the index construction method may be the following:

(a) choose the dimensionality of the index. Let it be k;
(b) create a k-valued array I;
(c) create a N-valued array S;
(d) set j=1;
(e) compute S(j)=variance(v(1,j), v(2,j) . . . v(M,j)) over all M visual assets;
(f) j=j+1;
(g) if j>N go to (h) else go to (e);
(h) sort S in descending order and let G be the sorted feature vector;
(i) fill index array I with I(1)=G(1), I(2)=G(2) . . . I(k)=G(k).

As a third embodiment of the index function consider that there exists a population of M example visual assets. Also consider that for the i-th visual asset, the N-valued feature vector F(i) is represented by values (v(i,1), v(i,2), . . . v(i,N)). The index can also be constructed by a standard dimensionality reduction technique like principle components analysis as found in any standard textbook of pattern recognition such as "Introduction to Statistical Pattern Recognition," (K. Fukunaga, Second Edition, Academic Press, 1990). In this case, the index construction method is the following:

(a) choose the dimensionality of the index. Let it be k;
(b) using the M N-valued feature vectors, compute the eigenvalues of matrix S following the procedures in "Numerical Recipes in C," (W. H. Press, S. A. Teulkolsky, W. T. Vetterling, B. P. Flannery, Second Edition, Cambridge University Press, 1996);

(c) sort the eigenvalues to retain the top k elements;

(d) transform every N-valued feature vector as an eigenvector of the k-dimensional space generated by the eigenvalues using the standard procedure detailed in textbooks such as "Numerical Recipes in C";

(e) use the k-valued transformed feature vector as the index.

Index Constraint Generation

Figure 5:
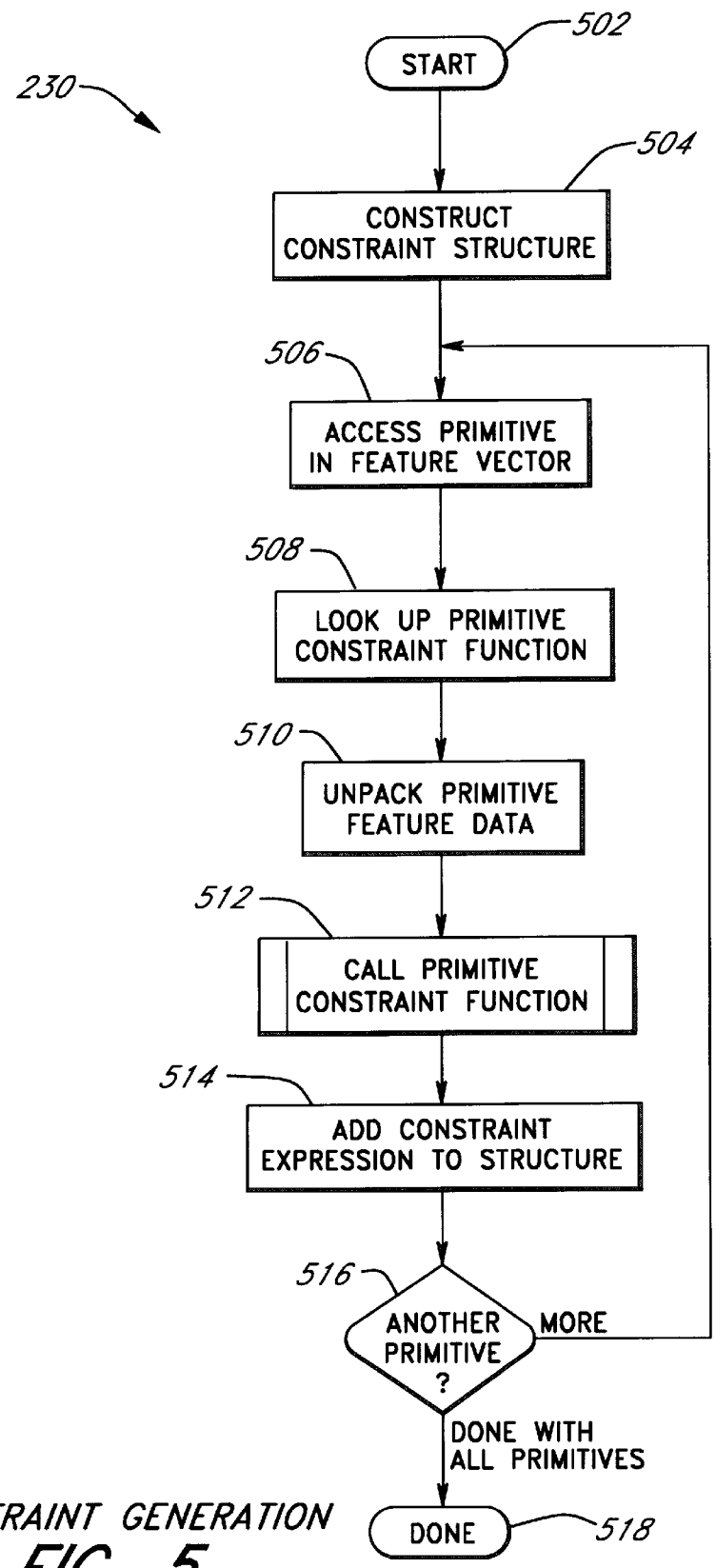
FIG. 5 is a flowchart of the constraint generation process shown in FIG. 3.

Referring now to FIG. 5, the index constraint generation function 230 used to generate or compute constraints will be described. Function 230 generates a constraint structure having a set of constraint expressions. Beginning at a start state 502, function 230 moves to a state 504 wherein an empty constraint structure is constructed. Proceeding to state 506, function 230 accesses one of the primitives in the feature vector for the target or query image. Continuing at state 508, the function 230 looks up the constraint function for the primitive accessed in state 506. Moving to state 510, the function 230 unpacks the feature data for the accessed primitive and, at state 512, calls the constraint function identified in state 508. The constraint function will be described hereinbelow. Proceeding to state 514, the constraint expression determined by the constraint function called at state 512 is added to the constraint structure constructed in state 504. Advancing to a decision state 516, the function 230 determines if there are additional primitives in the target feature vector to be processed. If so, function 230 moves back to state 506 to access the next primitive. Otherwise, if all primitives have been processed, as determined at decision state 516, function 230 completes at state 518.

For each primitive, a constraint function can be computed based on the index values of the query feature vector, the desired threshold T, and the user-defined weights, $W_i$. The purpose of this constraint is to define which feature vectors could be within an overall distance T from the query image. Feature vectors which do not meet these constraints will not satisfy the goal of the query, and will require no further processing. The process of determining whether these index constraints are satisfied should be much more efficient than the process of retrieving the feature vector and computing the actual visual distance.

Many known methods can be used to define the constraint function, $C_i(\ )$ for a primitive. The function $C_i(\ )$ must have the following behavior:

$$C_i(I_c, I_q, T_i) = \text{TRUE if } D(Q, W) <= T_i$$

where $I_c$ is the set of index values for the candidate feature vector, $I_q$ is the set of index values for the query feature vector, $T_i$ is the threshold for individual primitive i, as previously discussed, Q is the query feature vector, and W is the set of weights, $W_i$, for each primitive.

This behavior guarantees that any feature vector within a distance of T from the query feature vector will satisfy all constraints $C_i(\ )$. Failure to meet this requirement would result in feature vectors being eliminated from consideration, even though they were within the desired distance of the query feature vector. The optimal behavior is that each constraint, $C_i(\ )$, also has the following behavior:

$$C_i(I_c, I_q, T_i) = \text{FALSE if } D(Q, W) > T_i.$$

This further limits processing to only those feature vectors which are actually within a distance T of the query feature vector. Many known methods can be used to achieve this behavior in the constraint functions. A likely approach is to define an acceptable range (a minimum value and a maximum value) for each value in the set of index values $I_c$. The range is selectable depending on the domain of the visual objects. This range can be defined as $[I_{min},i, I_{max},i]$ for each index value $I_c,i$ in the set $I_c$. The function $C_i(I_c, I_q)$ then returns a value of TRUE if every index value in $I_c$ satisfies the corresponding range:

$$I_{min},i <= I_c,i <= I_{max},i.$$

This type of constraint can be handled very well by database software systems which provide efficient indexing capabilities for one dimensional data. Most commercial relational databases, for instance, processes these constraints very efficiently.

To improve the selectivity of the constraint functions, more complex constraints can be used. Although this may prohibit the constraints from being handled efficiently by certain database products, it will improve the selectivity of the indexing process such that fewer feature vectors require an actual distance computation in the VIR engine. As an example, consider a primitive which computes the Euclidean distance between n-dimensional values. Suppose that the index uses three of these values, $I_c,0, I_c,1, I_c, 2$, to represent the data for this primitive. The actual distance for the primitive, $d_i$, is computed as follows:

$$d_i = \sqrt{\sum (I_{q\_i} - I_{c\_i})^2} \text{ for } i = 0 \text{ to } n-1.$$

The index constraint function $C_i(I_c, I_q)$ must be such that:

$$C_i(I_c, I_q, T_i) = \text{TRUE if } \sqrt{\sum (I_{q\_i} - I_{c\_i})^2} <= T_i.$$

If the constraint is to use only simple ranges, the required range for each value $I_{c,i}$ can be defined as:

$$I_{min,i} = I_{q,i} - T_i, \text{ and}$$

$$I_{max,i} = I_{q,i} + T_i.$$

Alternatively, the constraint $C_i(\ )$ could use functionality beyond simple ranges for the individual values. In this case, the constraint function $C_i(I_c, I_q)$ could be defined using the actual constraint defined above:

$$C_i(I_c, I_q, T_i) = \text{TRUE if } \sqrt{\sum (I_{q\_i} - I_{c\_i})^2} <= T_i,$$

FALSE otherwise.

This implementation would result in fewer subsequent feature vector comparisons in the VIR engine, although the more complex computation may not be suitable for some storage methods.

In another embodiment, multiple primitives are used in a constraint, rather than each constraint using a single primitive.

Both of these methods are used for each primitive in the VIR engine. Index values for each feature vector are stored in a persistent data store, such as a commercial relational database system. Index values are chosen for each primitive, based on the distance function for that particular primitive. These index values are also stored in a persistent data store. It is not necessary that this be the same store used for the feature vectors. Two constraint functions are provided for each primitive. The first uses only simple range constraints on each index value. This allows efficient processing by relational database systems which can process one dimensional range queries very efficiently. The second set of constraint functions for each primitive is required only for those feature vectors which satisfied the first set of constraints. The second set of constraints utilizes more complex algorithms which further reduce the set of possible candidates. In general, the algorithms in these constraints are not handled as efficiently by commercial database systems, but are very effective at reducing the number of feature vectors which need to be considered. The set of feature vectors which satisfy both sets of constraints for every primitive must then be retrieved and compared with the actual query feature vector using the VIR engine. This process is very efficient at reducing the number of feature vectors which need to be compared.

While the above detailed description has shown, described, and pointed out the fundamental novel features of the invention as applied to various embodiments, it will be understood that various omissions and substitutions and changes in the form and details of the system illustrated may be made by those skilled in the art, without departing from the spirit of the invention.

What is claimed is:

1. A method of feature vector indexing, comprising the steps of:
   providing a plurality of feature vectors, each feature vector indicative of one of a plurality of objects, wherein each feature vector comprises at least one primitive, each primitive being associated with an attribute of the object and identifying a plurality of features, each feature having an associated feature coefficient;
   using a distance metric to select index values which are indicative of features of the feature vector;
   providing a target feature vector and a plurality of user weights;
   generating a constraint based on the target feature vector and the plurality of user weights; and
   applying the constraint to the index values so as to select a subset of the feature vectors.

2. The method of claim 1, wherein the primitive is color.

3. The method of claim 2, wherein the identified plurality of features include hue, saturation, and mean intensity.

4. The method of claim 1, wherein the primitive is texture.

5. The method of claim 4, wherein the identified plurality of features include edge intensity, randomness, periodicity, and orientation.

6. The method of claim 1, wherein the primitive is shape.

7. The method of claim 6, wherein the identified plurality of features include algebraic moments, turning angles, and elongatedness.

8. The method of claim 1, wherein each object comprises a portion of an image.

9. The method of claim 1, wherein each object comprises an entire image.

10. The method of claim 1, wherein each object comprises visual information.

11. The method of claim 1, additionally comprising the step of analyzing each of the plurality of objects resulting in one feature vector for each object.

12. The method of claim 1, wherein the distance metric utilizes the feature coefficients.

13. The method of claim 12, wherein the selected features of the feature vector have the highest feature coefficients with respect to the feature coefficients of the feature vector.

14. The method of claim 1, wherein each primitive of the feature vector is of a different primitive type and the index values are dependent on the primitive type.

15. The method of claim 1, wherein each of the user weights is associated with one of the primitives.

16. The method of claim 1, additionally comprising the step of comparing each one of the subset feature vectors with the target feature vector, wherein the user weights are combined with the results of the comparison to provide a score for each vector comparison.

17. The method of claim 16, additionally comprising the steps of:
   providing a primitive function to extract an attribute from each object; and
   adding a new primitive function, wherein the new primitive function comprises the comparing step for a selected attribute.

18. The method of claim 1, additionally comprising the steps of:
   providing a primitive function to extract an attribute from each object; and
   adding a new primitive function, wherein the new primitive function comprises an indexing step for a selected attribute.

19. The method of claim 1, additionally comprising the steps of:
   providing a primitive function to extract an attribute from each object; and
   adding a new primitive function, wherein the new primitive function comprises a generating a constraint step for a selected attribute.

20. A method of feature vector indexing, comprising the steps of:
   providing a plurality of feature vectors, each feature vector indicative of one of a plurality of objects, wherein each feature vector comprises at least one primitive, each primitive being associated with an attribute of the object and identifying a plurality of features;
   using a distance metric to select a plurality of index values which are indicative of features of the feature vector; and
   generating an index structure corresponding to the feature vectors and accessed by the selected index values.

21. A method of feature vector indexing, comprising the steps of:
   providing a plurality of feature vectors, each feature vector indicative of one of a plurality of objects;
   providing an index structure corresponding to the feature vectors, wherein the index values of the index structure are indicative of features of the feature vectors;
   providing a target feature vector and a plurality of user weights;
   generating a constraint based on the target feature vector and the plurality of user weights; and
   applying the constraint to the index structure so as to select a subset of the feature vectors.

* * * * *

UNITED STATES PATENT AND TRADEMARK OFFICE
CERTIFICATE OF CORRECTION

PATENT NO.   : 6,084,595
DATED        : July 4, 2000
INVENTOR(S)  : Bach et al.

It is certified that error appears in the above-identified patent and that said Letters Patent is hereby corrected as shown below:

<u>Column 1,</u>
Line 7, please insert:

--                    <u>Governmental Rights</u>
This invention was made with Government support under Contract No. DAAH01-97-C-R190, awarded by U.S. Army Aviation and Missile Command and Contract No. F33615-96-C-5615, awarded by Wright Laboratories, U.S. Air Force. The Government may have certain rights in this invention. --

Signed and Sealed this

Eighteenth Day of June, 2002

*Attest:*

*Attesting Officer*

JAMES E. ROGAN
*Director of the United States Patent and Trademark Office*